United States Patent
Musso et al.

(10) Patent No.: US 11,414,971 B2
(45) Date of Patent: Aug. 16, 2022

(54) METHODS AND MATERIALS FOR REDUCING LOST CIRCULATION IN A WELLBORE

(71) Applicant: Saudi Arabian Oil Company, Dhahran (SA)

(72) Inventors: Simone Musso, Houston, TX (US); Sivaprakash Shanmugam, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/111,554

(22) Filed: Dec. 4, 2020

(65) Prior Publication Data

US 2021/0172303 A1    Jun. 10, 2021

Related U.S. Application Data

(60) Provisional application No. 62/944,724, filed on Dec. 6, 2019.

(51) Int. Cl.
*E21B 21/00* (2006.01)
*E21B 43/25* (2006.01)
*C09K 8/42* (2006.01)

(52) U.S. Cl.
CPC .............. *E21B 43/25* (2013.01); *C09K 8/426* (2013.01); *E21B 21/003* (2013.01)

(58) Field of Classification Search
None
See application file for complete search history.

(56) References Cited

U.S. PATENT DOCUMENTS

| 2016/0122631 A1* | 5/2016 | Rodriguez | C09K 8/805 |
| | | | 166/280.1 |
| 2016/0145961 A1* | 5/2016 | Yu | B29C 44/186 |
| | | | 166/179 |
| 2018/0037803 A1 | 2/2018 | Dahi Taleghani et al. | |

(Continued)

FOREIGN PATENT DOCUMENTS

WO    2012103319 A1    8/2012
WO    2015108532 A1    7/2015

(Continued)

OTHER PUBLICATIONS

International Search Report and Written Opinion dated Mar. 2, 2021 pertaining to International application No. PCT/US2020/060342 filed Nov. 13, 2020, 13 pgs.

(Continued)

*Primary Examiner* — Andrew Sue-Ako
(74) *Attorney, Agent, or Firm* — Dinsmore & Shohl LLP

(57) ABSTRACT

A method of reducing lost circulation in a wellbore includes introducing a fluid including a fluid loss control additive comprising shape memory polymer, shape memory alloy, or both into the wellbore. The method further includes allowing the fluid loss control additive to lodge within fractures within a subsurface formation in the wellbore. The method further includes allowing the fluid loss control additive to expand within the fractures, thereby forming a barrier between the wellbore and the subsurface formation to reduce lost circulation in the wellbore.

19 Claims, 3 Drawing Sheets

(56) References Cited

U.S. PATENT DOCUMENTS

2018/0187539 A1* 7/2018 Hadi ................. F16F 15/22
2019/0375978 A1* 12/2019 Shojaei ................ E21B 43/25

FOREIGN PATENT DOCUMENTS

WO          2017184813  A1     10/2017
WO          2018118014  A1      6/2018

OTHER PUBLICATIONS

Hager et al., "Shape memory polymers: Past, present and future developments", Progress in Polymer Science vol. 49-50, pp. 3-33, 2015.

Jani et al., "A review of shape memory alloy research, applications, and opportunities", Materials and Design, vol. 56, pp. 1078-1113, 2014.

Yuan et al., "Shape forming by thermal expansion mismatch and shape memory locking in polymer/elastomer aminates", Smart Materials and Structures, vol. 26, 105027, 13 pages, 2017.

* cited by examiner

METHODS AND MATERIALS FOR REDUCING LOST CIRCULATION IN A WELLBORE

TECHNICAL FIELD

The present disclosure relates generally to methods and materials for reducing lost circulation in a wellbore.

BACKGROUND

Drilling fluid loss—commonly referred to as lost circulation—is a significant problem in the oil and gas industry. Lost circulation arises from wellbore drilling that penetrates into geological formations that are fractured, cavernous, vugular, underpressured, or highly permeable, such as those with a permeability greater than 100 Darcys. Lost circulation is typically classified into four volumetric loss rate categories or zones, depending on the amount of fluid lost per unit of time: seepage losses are those associated with the loss of less than about 10 barrels per hour; partial losses are those associated with the loss of between about 10 barrels per hour and about 100 barrels per hour; severe losses are those associated with the loss of over about 100 barrels per hour; while total losses are those where no fluid returns to the surface of the wellbore and that typically necessitate abandoning the well. Typically, the sizes of these geological voids can be correlated to whether the potential for drilling fluid loss fits into one of these four categories.

Lost circulation can be prevented in some circumstances through the use of pre-drilling geomechanical models and related analytical tools, as well as through the use of reinforced wellbore wall and related strengthening. In circumstances where such preventive measures do not provide ample protection against lost circulation, fluid loss control additives such as lost circulation materials (LCMs) may be introduced via the drilling fluid as a remediation approach.

SUMMARY

Lost circulation encountered while drilling is a major problem in the oil and gas industry that is difficult to combat in severe loss zones. The LCMs typically introduced into the wellbore to combat severe losses are cheap, easy to access materials. These small LCMs may be easily dislodged from the wellbore fractures and allow further fluid loss instead of packing the fractures and effectively preventing fluid loss. However, these materials are typically individual rubber particles that are not adhered to each other, or, if there is an adhesive, the rubber particles adhered to each other do not form a shape capable of being wedged into fractures and subsequently expanding within the fractures. These conventional materials are not engineered for the specific purpose of remediating severe losses, and therefore are not effective at blocking the severe zone. Accordingly, an improved approach to reducing or eliminating the loss of fluid for such severe loss zones is warranted. The fluid loss control additives as described in this disclosure include a shape memory polymer, shape memory alloy, or both. These fluid loss control additives are resilient and are capable of being wedged into fractures in a compressed form, and then expanding within the fractures to form a barrier between the wellbore and the subsurface formation, thereby blocking the severe loss zone and remediating severe losses.

According to one embodiment, a method of reducing lost circulation in a severe loss zone of a wellbore is disclosed. The method includes introducing a fluid comprising a fluid loss control additive comprising shape memory polymer, shape memory alloy, or both into the wellbore. The method further includes allowing the fluid loss control additive to lodge within fractures within a subsurface formation in the wellbore and allowing the fluid loss control additive to expand within the fractures, thereby forming a barrier between the wellbore and the subsurface formation to reduce lost circulation in the wellbore.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

The fluid loss control additives of this disclosure are directed to holistically address the various shapes of fractures in loss zones. As used throughout this disclosure, the term "lost circulation zone" refers to a formation encountered during drilling into which circulating fluids can be lost due to fractures in the formation. As used throughout this disclosure, the term "formation" or "subsurface formation" refers to a subterranean geologic region containing hydrocarbons, such as crude oil, hydrocarbon gases, or both, which may be extracted from the subterranean geologic region.

Loss zones dominated by fractures (also referred to as fracture openings) of various sizes can be effectively sealed and blocked by the fluid loss control additives of this disclosure of varying dimensions. In one particular form, these wellbore loss zones dominated by such fracture (or fracture openings) correspond to severe loss zones such that the introduction of these capsule-shaped LCMs can reduce or eliminate lost circulation owing at least in part to the size and generally non-axisymmetric shape of such capsule-shaped LCMs. As used throughout this disclosure, severe loss zones may be found in fractured, cavernous, vugular, underpressured or highly permeable geological formations, such as those with a permeability greater than 100 Darcys. Severe loss zones generally do not include impermeable or zones with a permeability of less than 10 Darcys, overpressured zones or deep sand.

The reduction or elimination of lost circulation takes place through the formation of set seals or plugs that result from the capsule-shaped LCMs becoming lodged into the fractures such that the capsule-shaped LCMs experience in-situ stresses from the subterranean walls that define the fractures As referenced previously, lost circulation is typically classified into four volumetric loss rate categories. Typically, the size of these geological voids can be correlated to whether the potential for drilling fluid loss fits into one of these four zones (seepage losses, partial losses, severe losses, and total losses). As used throughout this disclosure, the term "drilling fluid" refers to any of a number of liquid and gaseous fluids and mixtures of fluids and solids (as solid suspensions, mixtures and emulsions of liquids, gases and solids) used in operations to drill boreholes into the earth. These geological voids, or fractures, may be measured by running logs down the annulus to determine the opening size of the fractures. As used throughout this disclosure, the term "annulus" refers to the space between two concentric objects, such as between the wellbore and casing or between casing and tubing, where fluid can flow. Likewise, the term "pipe" may refer to drill collars, drill pipe, casing or tubing.

Figure 1:
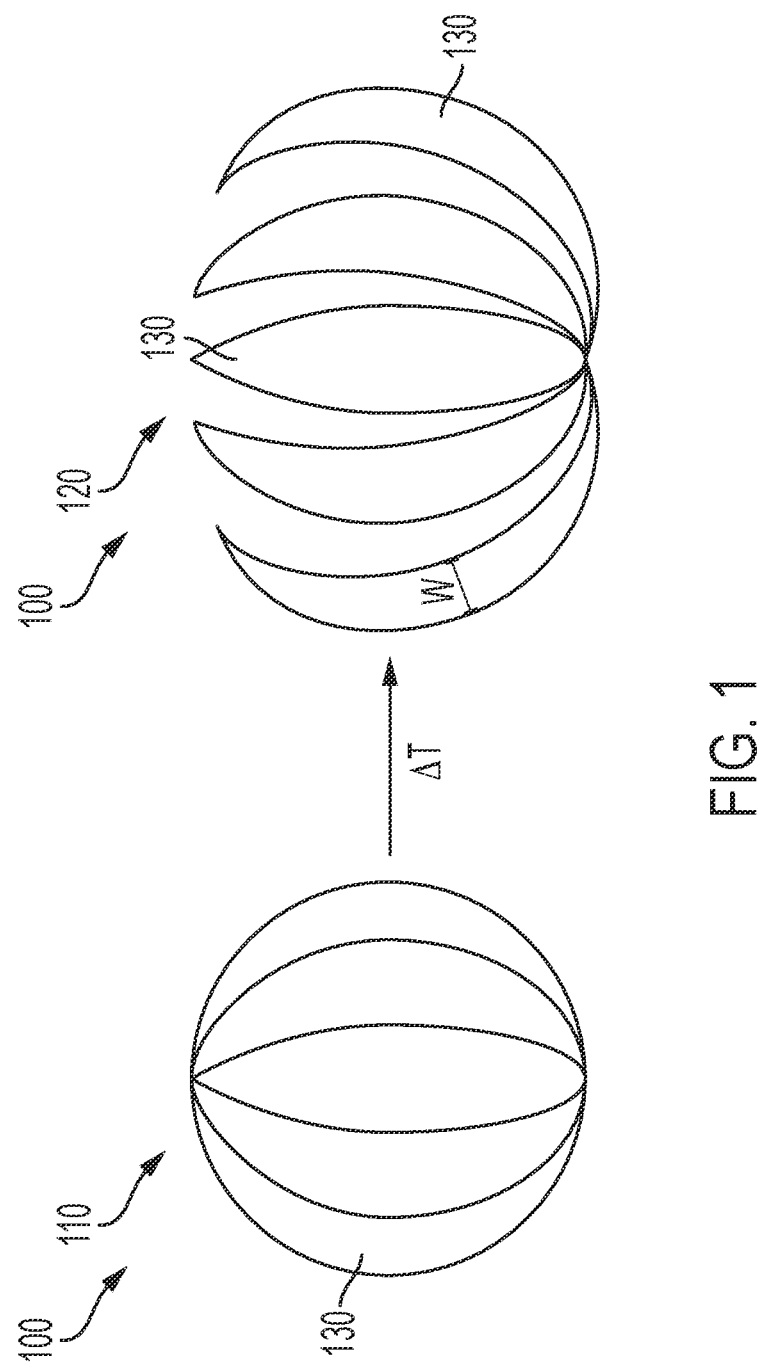
FIG. 1 schematically depicts a fluid loss control additive according to one or more embodiments of this disclosure.
Figure 2:
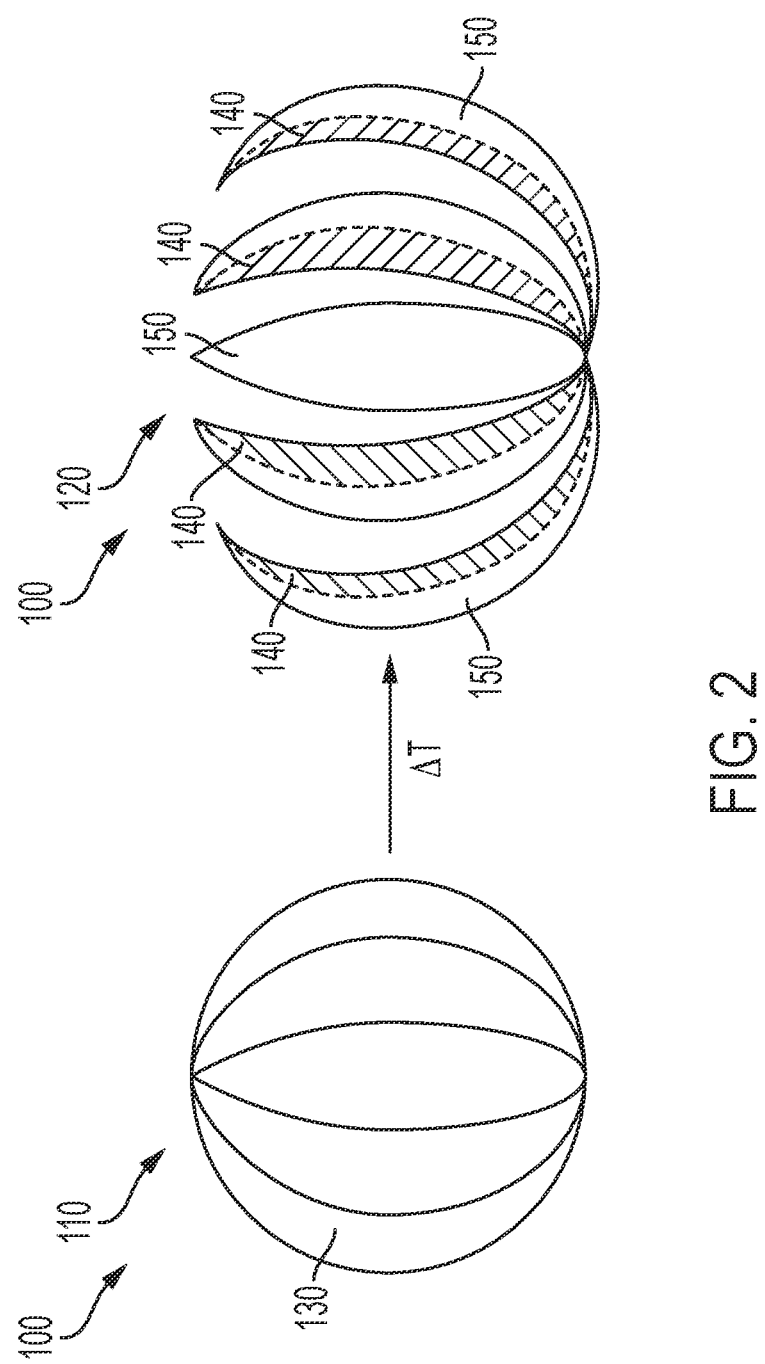
FIG. 2 schematically depicts a fluid loss control additive according to one or more embodiments of this disclosure.

Referring first to FIG. 1, a fluid loss control additive for a wellbore drilling fluid is shown. The fluid loss control additive 100 may include shape memory polymer (SMP), shape memory alloy (SMA), or both. The fluid loss control additive 100 may include a plurality of fronds 130. The fronds 130 may be oriented such that the fluid loss control additive 100 may have a compressed form 110 and an expanded form 120, as shown in both FIGS. 1 and 2. As will be discussed in further detail subsequently, the fluid loss control additive 100 may expand from the compressed form 110 to the expanded form 120 due to a change in temperature ΔT. When the fluid loss control additive 100 expands from the compressed form 110 to the expanded form 120, the fluid loss control additive 100 may blossom such that side portions (such as the fronds 130) of the fluid loss control additive 100 separate and extend outwards from a center of the fluid loss control additive 100, as shown in FIGS. 1 and 2.

SMAs are alloys that remember their initial shape, but are capable of deformation. Whenever SMAs are deformed and then heated to greater than or equal to the temperature at which the SMAs were formed (such as the printing temperature $T_p$ described subsequently), the SMAs return back to their initial shape. The fluid loss control additive 100 has a compressed form 110 and an expanded form 120. In embodiments, the expanded form 120 may be the initial shape of the SMA, and therefore, the SMAs described in this disclosure have an expansion temperature $T_e$ at which, or greater than which, the SMA will expand the fluid loss additive 100 from the compressed form 110 to the expanded form 120. $T_e$ may range from 60° C. to 500° C., from 60° C. to 300° C., from 60° C. to 280° C., from 60° C. to 260° C., from 60° C. to 230° C., from 60° C. to 200° C., from 60° C. to 180° C., from 60° C. to 160° C., from 60° C. to 130° C., from 60° C. to 100° C., from 60° C. to 80° C., from 80° C. to 500° C., from 80° C. to 300° C., from 80° C. to 280° C., from 80° C. to 260° C., from 80° C. to 230° C., from 80° C. to 200° C., from 80° C. to 180° C., from 80° C. to 160° C., from 80° C. to 130° C., from 80° C. to 100° C., from 100° C. to 500° C., from 100° C. to 300° C., from 100° C. to 280° C., from 100° C. to 260° C., from 100° C. to 230° C., from 100° C. to 200° C., from 100° C. to 180° C., from 100° C. to 160° C., from 100° C. to 130° C., from 130° C. to 500° C., from 130° C. to 300° C., from 130° C. to 280° C., from 130° C. to 260° C., from 130° C. to 230° C., from 130° C. to 200° C., from 130° C. to 180° C., from 130° C. to 160° C., from 160° C. to 500° C., from 160° C. to 300° C., from 160° C. to 280° C., from 160° C. to 260° C., from 160° C. to 230° C., from 160° C. to 200° C., from 160° C. to 180° C., from 180° C. to 500° C., from 180° C. to 300° C., from 180° C. to 280° C., from 180° C. to 260° C., from 180° C. to 230° C., from 180° C. to 200° C., from 200° C. to 500° C., from 200° C. to 300° C., from 200° C. to 280° C., from 200° C. to 260° C., from 200° C. to 230° C., from 230° C. to 500° C., from 230° C. to 300° C., from 230° C. to 280° C., from 230° C. to 260° C., from 260° C. to 500° C., from 260° C. to 300° C., from 260° C. to 280° C., from 280° C. to 500° C., from 280° C. to 300° C., or from 300° C. to 500° C. In embodiments, $T_e$ may be greater than 50° C., greater than 70° C., greater than 90° C., greater than 120° C., greater than 150° C., greater than 170° C., greater than 190° C., greater than 220° C., or greater than 250° C. In embodiments, $T_e$ may equal $T_p$, as described subsequently.

In embodiments, the SMA may include a metal alloy including nickel, titanium, copper, gold, iron, zinc, aluminum, or combinations thereof. In some embodiments, the SMAs are selected from metal alloys including copper-aluminum-nickel (Cu—Al—Ni) and nickel-titanium (Ni—Ti) alloys.

SMAs are generally lightweight, solid-state, and have a density from greater than or equal to 6.0 to less than or equal to 8.0 grams per cubic centimeter (gm/cc) measured by ASTM D792-13, such as, for example, from greater than or equal to 6.2 to less than or equal to 8.0 gm/cc, from greater than or equal to 6.4 to less than or equal to 8.0 gm/cc, from greater than or equal to 6.6 to less than or equal to 8.0 gm/cc, from greater than or equal to 6.8 to less than or equal to 8.0 gm/cc, from greater than or equal to 7.0 to less than or equal to 8.0 gm/cc, from greater than or equal to 7.2 to less than or equal to 8.0 gm/cc, from greater than or equal to 7.4 to less than or equal to 8.0 gm/cc, from greater than or equal to 7.6 to less than or equal to 8.0 gm/cc, or from greater than or equal to 7.8 to less than or equal to 8.0 gm/cc. In some embodiments, the SMAs have a density from greater than or equal to 6.0 gm/cc to less than or equal to 7.8 gm/cc, such as from greater than or equal to 6.0 gm/cc to less than or equal to 7.6 gm/cc, from greater than or equal to 6.0 gm/cc to less than or equal to 7.4 gm/cc, from greater than or equal to 6.0 gm/cc to less than or equal to 7.2 gm/cc, from greater than or equal to 6.0 gm/cc to less than or equal to 7.0 gm/cc, from greater than or equal to 6.0 gm/cc to less than or equal to 6.8 gm/cc, from greater than or equal to 6.0 gm/cc to less than or equal to 6.6 gm/cc, from greater than or equal to 6.0 gm/cc to less than or equal to 6.4 gm/cc, or from greater than or equal to 6.0 gm/cc to less than or equal to 6.2 gm/cc. In some embodiments, the SMAs have a density from greater than or equal to 6.2 gm/cc to less than or equal to 7.8 gm/cc, such as from greater than or equal to 6.4 gm/cc to less than or equal to 7.6 gm/cc, from greater than or equal to 6.6 gm/cc to less than or equal to 7.4 gm/cc, or from greater than or equal to 6.8 gm/cc to less than or equal to 7.2 gm/cc. SMAs within the ranges as previously described will be suspended within the fluid, thereby flowing within the fluid through the wellbore and lodging within the subsurface formation as described in this application. Without intending to be bound by theory, SMAs more dense than the ranges previously described would sink within the fluid, thereby causing turbulence and drag, and possibly falling out of the fluid. Similarly, SMAs less dense than the ranges previously described would float to the surface of the fluid, fail to flow within the fluid, and thereby fail to lodge within the subsurface formation effectively.

Figure 3:
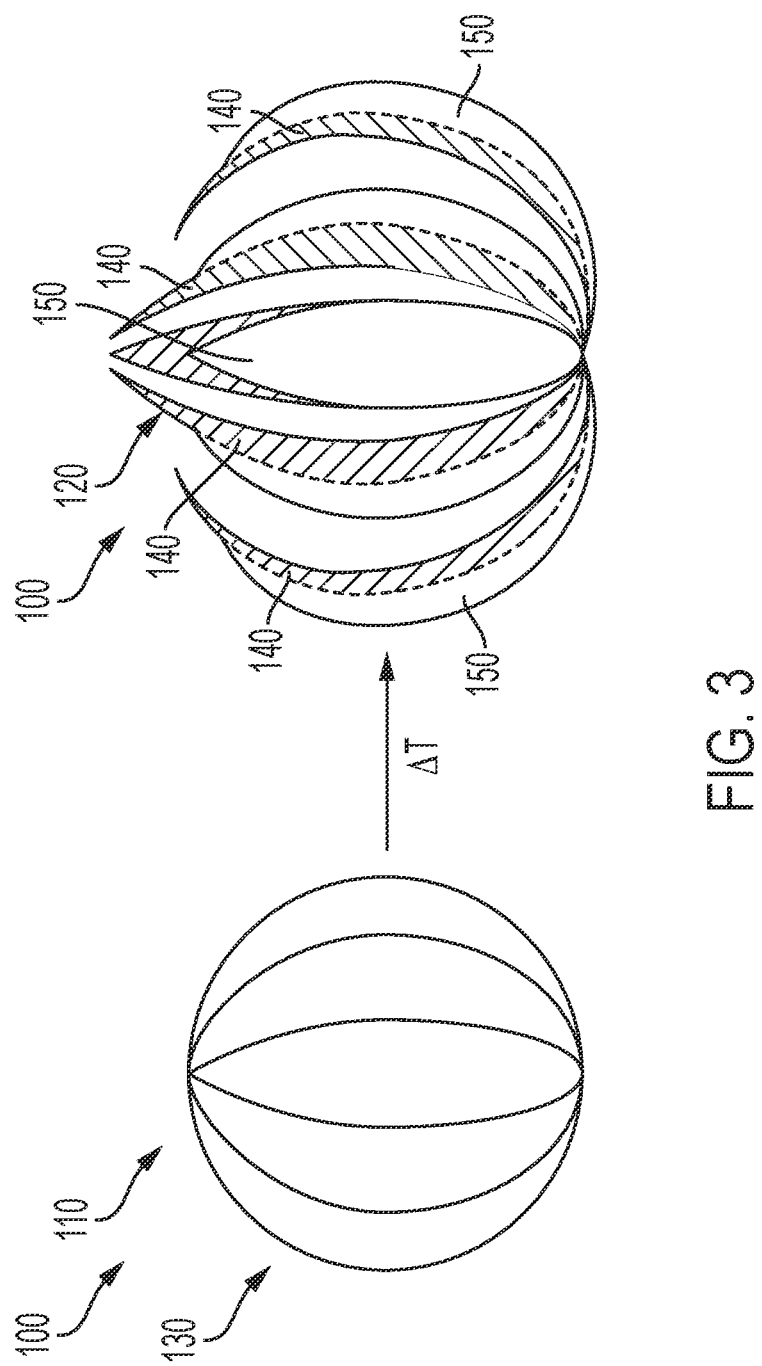
FIG. 3 schematically depicts a fluid loss control additive according to one or more embodiments of this disclosure.

Referring now to FIGS. 2 and 3, in embodiments, the fluid loss control additive 100 may include an inner layer 140 and an outer layer 150. More particularly, each individual frond 130 of the plurality of fronds 130 may include an inner layer 140 and an outer layer 150. The frond 130, the inner layer 140, the outer layer 150, or combinations thereof may have a thickness ranging from 0.5 to 5 millimeters (mm), from 0.5 to 4 mm, from 0.5 to 3 mm, from 0.5 to 2.5 mm, from 0.5 to 2 mm, from 0.5 to 1.5 mm, from 0.5 to 1 mm, from 1 to 5 mm, from 1 to 4 mm, from 1 to 3 mm, from 1 to 2.5 mm, from 1 to 2 mm, from 1 to 1.5 mm, from 1.5 to 5 mm, from 1.5 to 4 mm, from 1.5 to 3 mm, from 1.5 to 2.5 mm, from 1.5 to 2 mm, from 2 to 5 mm, from 2 to 4 mm, from 2 to 3 mm, from 2 to 2.5 mm, from 2.5 to 5 mm, from 2.5 to 4 mm, from 2.5 to 3 mm, from 3 to 5 mm, from 3 to 4 mm, or from 4 to 5 mm. In embodiments, the outer layer 150 may have a lesser thickness than the inner layer 140. For example, the inner layer 140 may be 0.5 mm, 0.75 mm, 1.00 mm, 1.25 mm, 1.5 mm, 1.75 mm, or 2 mm thicker than the outer layer 150.

As shown in FIG. 3, in embodiments, the inner layer 140 may extend higher than the outer layer 150 when the fluid loss control additive 100 is in the expanded form 120. Without intending to be bound by theory, in order for the inner layer 140 to be longer than the outer layer 150, the inner layer 140 may curl inside itself when the fluid loss control additive 100 is in the compressed form 110. Similarly, in embodiments, the inner layer 140 may extend wider than the outer layer 150 when the fluid loss control additive 100 is in the expanded form 120 (not shown), thereby reducing open space between the outer layers 150 when the fluid loss control additive 100 is in the expanded form 120. Without intending to be bound by theory, in order for the inner layer 140 to be wider than the outer layer 150, the inner layer 140 may curl inside itself when the fluid loss control additive 100 is in the compressed form 110. Additionally, in some embodiments (not shown), the inner layer 140 may extend both higher and wider than the outer layer 150 when the fluid loss control additive 100 is in the expanded form 120. In such embodiments, the fluid loss control additive 100 may cover more surface area than in embodiments where the inner layer 140 does not extend wider or higher than the outer layer 150 when the fluid loss control additive 100 is in the expanded form 120, thereby more effectively reducing lost circulation.

Referring again to FIGS. 2 and 3, the inner layer 140 may include a first SMP. In embodiments, the outer layer 150 may include a second SMP or an SMA including those previously described. The SMPs may be include polyether ether ketone, sulfonated polyether ether ketone, polystyrene, poly(lauryl acrylate), polyurethane, polydimethylsiloxane, or combinations thereof. The SMPs may further include a composite having fibers infused with shape memory polymer resin. Additionally, in embodiments, the shape memory polymer may further include nano-silica, nano-alumina, nano-zinc oxide, carbon nanotubes, nano-calcium carbonate, mica, vanadium pentoxide, boron nitride nanotubes, nano-zirconium oxide, graphene, carbon black, or combinations of these.

In embodiments, the first SMP may have a glass transition temperature $T_{g1}$ greater than a glass transition temperature $T_{g2}$ of the second SMP. Glass transition is the gradual and reversible transition in amorphous materials (or in amorphous regions within semicrystalline materials), from a hard and relatively brittle "glassy" state into a viscous or rubbery state as temperature is increased. The glass-transition temperature, $T_g$, of a material characterizes the range of temperatures over which this glass transition occurs. The glass-transition temperature of a material is less than the melting temperature, $T_m$, of the crystalline state of the material. Therefore, similarly to the glass transition temperatures, in embodiments, the first SMP may have a melting temperature $T_{m1}$ greater than a melting temperature $T_{m2}$ of the second SMP. For example, and not by way of limitation, in embodiments, the first SMP may specifically include polyether ether ketone, sulfonated polyether ether ketone, polystyrene, poly (lauryl acrylate), or combinations thereof and the second SMP may specifically include polyurethane, polydimethylsiloxane, or combinations thereof. Therefore, if the subsurface formation has a formation temperature $T_f$ of greater than or equal to $T_{g2}$, $T_{m2}$, or both, the fluid loss control additive will expand from the compressed form to the expanded form once a temperature of the outer layer of the fluid loss control additive is greater than or equal to $T_{g2}$, $T_{m2}$, or both. Specifically, as a temperature of the fluid loss control additive increases due to formation temperature, the second SMP may reach a melting temperature or glass-transition temperature before the first SMP reaches a melting temperature or glass-transition temperature. This may result in the outer layer (which includes the second SMP) becoming malleable, thereby allowing the fluid loss control additive to expand from the compressed form into the expanded form once a temperature of the outer layer is greater than or equal to $T_{g2}$, $T_{m2}$, or both.

The glass transition temperature $T_{g1}$ of the first SMP may range from 60° C. to 500° C., from 60° C. to 300° C., from 60° C. to 280° C., from 60° C. to 260° C., from 60° C. to 230° C., from 60° C. to 200° C., from 60° C. to 180° C., from 60° C. to 160° C., from 60° C. to 130° C., from 60° C. to 100° C., from 60° C. to 80° C., from 80° C. to 500° C., from 80° C. to 300° C., from 80° C. to 280° C., from 80° C. to 260° C., from 80° C. to 230° C., from 80° C. to 200° C., from 80° C. to 180° C., from 80° C. to 160° C., from 80° C. to 130° C., from 80° C. to 100° C., from 100° C. to 500° C., from 100° C. to 300° C., from 100° C. to 280° C., from 100° C. to 260° C., from 100° C. to 230° C., from 100° C. to 200° C., from 100° C. to 180° C., from 100° C. to 160° C., from 100° C. to 130° C., from 130° C. to 500° C., from 130° C. to 300° C., from 130° C. to 280° C., from 130° C. to 260° C., from 130° C. to 230° C., from 130° C. to 200° C., from 130° C. to 180° C., from 130° C. to 160° C., from 160° C. to 500° C., from 160° C. to 300° C., from 160° C. to 280° C., from 160° C. to 260° C., from 160° C. to 230° C., from 160° C. to 200° C., from 160° C. to 180° C., from 180° C. to 500° C., from 180° C. to 300° C., from 180° C. to 280° C., from 180° C. to 260° C., from 180° C. to 230° C., from 180° C. to 200° C., from 200° C. to 500° C., from 200° C. to 300° C., from 200° C. to 280° C., from 200° C. to 260° C., from 200° C. to 230° C., from 230° C. to 500° C., from 230° C. to 300° C., from 230° C. to 280° C., from 230° C. to 260° C., from 260° C. to 500° C., from 260° C. to 300° C., from 260° C. to 280° C., from 280° C. to 500° C., from 280° C. to 300° C., or from 300° C. to 500° C. In embodiments, $T_{g1}$ may be greater than 50° C., greater than 70° C., greater than 90° C., greater than 120° C., greater than 150° C., greater than 170° C., greater than 190° C., greater than 220° C., or greater than 250° C.

The glass transition temperature $T_{g2}$ of the second SMP may range from 50° C. to 250° C., from 50° C. to 220° C., from 50° C. to 190° C., from 50° C. to 170° C., from 50° C. to 150° C., from 50° C. to 120° C., from 50° C. to 90° C., from 50° C. to 70° C., from 70° C. to 250° C., from 70° C. to 220° C., from 70° C. to 190° C., from 70° C. to 170° C., from 70° C. to 150° C., from 70° C. to 120° C., from 70° C. to 90° C., from 90° C. to 250° C., from 90° C. to 220° C., from 90° C. to 190° C., from 90° C. to 170° C., from 90° C. to 150° C., from 90° C. to 120° C., from 120° C. to 250° C., from 120° C. to 220° C., from 120° C. to 190° C., from 120° C. to 170° C., from 120° C. to 150° C., from 150° C. to 250° C., from 150° C. to 220° C., from 150° C. to 190° C., from 150° C. to 170° C., from 170° C. to 250° C., from 170° C. to 220° C., from 170° C. to 190° C., from 190° C. to 250° C., from 190° C. to 220° C., or from 220° C. to 250° C. In embodiments, $T_{g2}$ may be 50° C., less than or equal to 70° C., less than or equal to 90° C., less than or equal to 120° C., less than or equal to 150° C., less than or equal to 170° C., less than or equal to 190° C., less than or equal to 220° C., or less than or equal to 250° C.

The melting temperature $T_{m1}$ of the first SMP may range from 60° C. to 500° C., from 60° C. to 300° C., from 60° C. to 280° C., from 60° C. to 260° C., from 60° C. to 230° C., from 60° C. to 200° C., from 60° C. to 180° C., from 60° C. to 160° C., from 60° C. to 130° C., from 60° C. to 100° C., from 60° C. to 80° C., from 80° C. to 500° C., from 80° C. to 300° C., from 80° C. to 280° C., from 80° C. to 260° C., from 80° C. to 230° C., from 80° C. to 200° C., from 80° C. to 180° C., from 80° C. to 160° C., from 80° C. to 130° C., from 80° C. to 100° C., from 100° C. to 500° C., from 100° C. to 300° C., from 100° C. to 280° C., from 100° C. to 260° C., from 100° C. to 230° C., from 100° C. to 200° C., from 100° C. to 180° C., from 100° C. to 160° C., from 100° C. to 130° C., from 130° C. to 500° C., from 130° C. to 300° C., from 130° C. to 280° C., from 130° C. to 260° C., from 130° C. to 230° C., from 130° C. to 200° C., from 130° C. to 180° C., from 130° C. to 160° C., from 160° C. to 500° C., from 160° C. to 300° C., from 160° C. to 280° C., from 160° C. to 260° C., from 160° C. to 230° C., from 160° C. to 200° C., from 160° C. to 180° C., from 180° C. to 500° C., from 180° C. to 300° C., from 180° C. to 280° C., from 180° C. to 260° C., from 180° C. to 230° C., from 180° C. to 200° C., from 200° C. to 500° C., from 200° C. to 300° C., from 200° C. to 280° C., from 200° C. to 260° C., from 200° C. to 230° C., from 230° C. to 500° C., from 230° C. to 300° C., from 230° C. to 280° C., from 230° C. to 260° C., from 260° C. to 500° C., from 260° C. to 300° C., from 260° C. to 280° C., from 280° C. to 500° C., from 280° C. to 300° C., or from 300° C. to 500° C. In embodiments, $T_{m1}$ may be greater than 50° C., greater than 70° C., greater than 90° C., greater than 120° C., greater than 150° C., greater than 170° C., greater than 190° C., greater than 220° C., or greater than 250° C.

In embodiments, $T_{m2}$ may range from 50° C. to 250° C., from 50° C. to 220° C., from 50° C. to 190° C., from 50° C. to 170° C., from 50° C. to 150° C., from 50° C. to 120° C., from 50° C. to 90° C., from 50° C. to 70° C., from 70° C. to 250° C., from 70° C. to 220° C., from 70° C. to 190° C., from 70° C. to 170° C., from 70° C. to 150° C., from 70° C. to 120° C., from 70° C. to 90° C., from 90° C. to 250° C., from 90° C. to 220° C., from 90° C. to 190° C., from 90° C. to 170° C., from 90° C. to 150° C., from 90° C. to 120° C., from 120° C. to 250° C., from 120° C. to 220° C., from 120° C. to 190° C., from 120° C. to 170° C., from 120° C. to 150° C., from 150° C. to 250° C., from 150° C. to 220° C., from 150° C. to 190° C., from 150° C. to 170° C., from 170° C. to 250° C., from 170° C. to 220° C., from 170° C. to 190° C., from 190° C. to 250° C., from 190° C. to 220° C., or from 220° C. to 250° C. In embodiments, $T_{m2}$ may be 50° C., less than or equal to 70° C., less than or equal to 90° C., less than or equal to 120° C., less than or equal to 150° C., less than or equal to 170° C., less than or equal to 190° C., less than or equal to 220° C., or less than or equal to 250° C.

In addition to the type of SMAs or the type of SMPs used in embodiments, the size of the fluid loss control additive used will affect the functionality of the fluid loss control additive. If the fluid loss control additives are too large, they will screen out material that is needed for near-wellbore diversion and plugging. Further, fluid loss control additives that are too large are not suitable for far-field diversion. As used in this description, "near wellbore" is defined as the perforation zone and the inlet of fracturing, and "far-field" is defined as being inside the fracture where the width of a fracture is less than 0.04 inches. However, if the fluid loss control additives are too small, they cannot be used for either near-wellbore or far-field diversion and plugging. In embodiments, the fluid loss control additives are essentially spherical, which is defined in this disclosure as being spherical with minor variations in diameter that are not intended in the manufacturing process. In such embodiments, the fluid loss control additives have an average diameter, $d_{50}$, as measured by API RP 13C, when compressed (or before expansion), of from greater than or equal to 0.075 millimeters (mm) to less than or equal to 8.000 mm, such as from greater than or equal to 0.500 mm to less than or equal to 8.000 mm, from greater than or equal to 1.000 mm to less than or equal to 8.000 mm, from greater than or equal to 1.500 mm to less than or equal to 8.000 mm, from greater than or equal to 2.000 mm to less than or equal to 8.000 mm, from greater than or equal to 2.500 mm to less than or equal to 8.000 mm, from greater than or equal to 3.000 mm to less than or equal to 8.000 mm, from greater than or equal to 3.500 mm to less than or equal to 8.000 mm, from greater than or equal to 4.000 mm to less than or equal to 8.000 mm, from greater than or equal to 4.500 mm to less than or equal to 8.000 mm, from greater than or equal to 5.000 mm to less than or equal to 8.000 mm, from greater than or equal to 5.500 mm to less than or equal to 8.000 mm, from greater than or equal to 6.000 mm to less than or equal to 8.000 mm, from greater than or equal to 6.500 mm to less than or equal to 8.000 mm, from greater than or equal to 7.000 mm to less than or equal to 8.000 mm, or from greater than or equal to 7.500 mm to less than or equal to 8.000 mm. In other embodiments, the fluid loss control additives have an average diameter, when compressed, from greater than or equal to from greater than or equal to 0.075 mm to less than or equal to 7.500 mm, from greater than or equal to 0.075 mm to less than or equal to 7.000 mm, from greater than or equal to 0.075 mm to less than or equal to 6.500 mm, from greater than or equal to 0.075 mm to less than or equal to 6.000 mm, from greater than or equal to 0.075 mm to less than or equal to 5.500 mm, from greater than or equal to 0.075 mm to less than or equal to 5.000 mm, from greater than or equal to 0.075 mm to less than or equal to 4.500 mm, from greater than or equal to 0.075 mm to less than or equal to 4.000 mm, from greater than or equal to 0.075 mm to less than or equal to 3.500 mm, from greater than or equal to 0.075 mm to less than or equal to 3.000 mm, from greater than or equal to 0.075 mm to less than or equal to 2.500 mm, from greater than or equal to 0.075 mm to less than or equal to 2.000 mm, from greater than or equal to 0.075 mm to less than or equal to 1.500 mm, from greater than or equal to 0.075 mm to less than or equal to 1.000 mm, or from greater than or equal to 0.075 mm to less than or equal to 0.500 mm.

When expanded, the fluid loss control additives may have an average diameter, $d_{50}$, as measured by API RP 13C of from greater than or equal to 5 mm to less than or equal to 20 mm, from greater than or equal to 5 mm to less than or equal to 17.5 mm, from greater than or equal to 5 mm to less than or equal to 15 mm, from greater than or equal to 5 mm to less than or equal to 12.5 mm, from greater than or equal to 5 mm to less than or equal to 10 mm, from greater than or equal to 5 mm to less than or equal to 7.5 mm, from greater than or equal to 7.5 mm to less than or equal to 20 mm, from greater than or equal to 7.5 mm to less than or equal to 17.5 mm, from greater than or equal to 7.5 mm to less than or equal to 15 mm, from greater than or equal to 7.5 mm to less than or equal to 12.5 mm, from greater than or equal to 7.5 mm to less than or equal to 10 mm, from greater than or equal to 10 mm to less than or equal to 20 mm, from greater than or equal to 10 mm to less than or equal to 17.5 mm, from greater than or equal to 10 mm to less than or equal to 15 mm, from greater than or equal to 10 mm to less than or equal to 12.5 mm, from greater than or equal to 12.5 mm to less than or equal to 20 mm, from greater than or equal to 12.5 mm to less than or equal to 17.5 mm, from greater than or equal to 12.5 mm to less than or equal to 15 mm, from greater than or equal to 15 mm to less than or equal to 20 mm, from greater than or equal to 15 mm to less than or equal to 17.5 mm, or from greater than or equal to 17.5 mm to less than or equal to 20 mm.

The method of reducing lost circulation in a wellbore included in this disclosure may include introducing a fluid (such as a drilling fluid) including the fluid loss control additives into the wellbore, thereby introducing the fluid loss control additives into a severe loss zone. The method further includes allowing the fluid loss control additives to lodge in at least one fracture that defines the severe loss zone within a subsurface formation. The method further includes allowing the fluid loss control additive to expand within the fracture, thereby forming a barrier between the wellbore and the subsurface formation including the severe loss zone.

Furthermore, in embodiments where the subsurface formation has a formation temperature $T_f$ greater than or equal to the expansion temperature $T_e$ of the shape memory alloy as previously described, the fluid loss control additive may experience an increase in temperature downhole. In such embodiments, allowing the fluid loss control additive to expand within the fractures may include allowing the fluid loss control additive to expand from the compressed form to the expanded form once a temperature of the shape memory alloy is greater than or equal to $T_e$ as previously described.

In embodiments, the drilling fluid may be introduced into the severe loss zone such that the fluid loss control additives become lodged in the fractures that define the severe loss zone; such lodging forms flow blockage that helps to isolate the severe loss zone of the wellbore. To isolate the severe loss zone, the fluid loss control additive is introduced into the severe loss zone as squeezing pressure is applied down the wellbore. This squeezing pressure causes the fluid loss control additive to slide into the fracture openings, wedging the fluid loss control additive into the cone-shaped fracture openings and sealing the severe loss zone.

Significantly, the orientation of the fractures within a loss zone is not important, as the fluid loss control additive will work with both vertical and horizontal fractures. The fronds of the fluid loss control additive may adjust under the pressure of the formation with a change in their shape and size while still maintaining a close contact with the internal surface of the fractures or channels of the loss zones. Significantly, after the cessation of pumping, the expansion of the fluid loss control additives from the compressed form to the expanded form due to the increased temperature allows them to remain in place in order to maintain the tight fit condition and prevent fluid loss. In embodiments, the fluid loss control additives may have a smooth outer surface; such construction promotes reduced friction between the fluid loss control additives and the fracture loss zones. Without intending to be bound by theory, this reduced friction may assist in introducing the fluid loss control additives to the loss zone and enhance the ability of the fluid loss control additives to seal and plug the fluid escaping channels. In this manner, the fluid loss control additives may seal or plug the channels at a narrow or restricted zone of the flow path and thus prevent or reduce fluid loss from the wellbore into a neighboring formation.

It should be understood that the change in temperature within the wellbore that causes the fluid loss additives to expand can be effectuated by altering the type of fluid that is being pumped into the wellbore as well as the flow rate of the fluid that is being pumped into the wellbore. For instance, a lesser viscosity fluid that is being pumped into the wellbore at a greater injection rate, such as up to 130 barrels per min (bbl/min), will make the downhole temperature close to the surface temperature. In contrast, a greater viscosity fluid that is being pumped into the wellbore at lesser injection rate, such as 20 bbl/min, will make the downhole temperature close to the formation temperature, which is greater than the surface temperature. It should be understood that the temperature within the wellbore and the effect that fluids and injection rates will have on the temperature within the wellbore can be determined by a skilled artisan using wellbore temperature models and modeling software, such as, for example, Mfrac available from Baker Hughes.

In another embodiment, the method further comprises drilling through a plurality of fluid loss control additives, thereby sealing the severe loss zone. The method may then further include continuing to drill the wellbore. In another embodiment, the method further comprises introducing the fluid loss control additives to the severe loss zone through a drill string disposed within the wellbore. In another embodiment, the method further comprises introducing a displacement fluid to displace the fluid loss control additives from the wellbore into the severe loss zone.

Methods of producing the fluid loss control additives are also described. In embodiments, the fluid loss control additive, the SMP, the SMA, or combinations thereof may be formed via 3D printing at a printing temperature $T_p$. The printing temperature $T_p$ may be equal to the expansion temperature $T_e$ as previously discussed. The method of producing the fluid loss control additive may further include cooling the fluid loss control additive, the SMP, the SMA, or combinations thereof to a temperature less than $T_p$ and closing the fluid loss control additive, the SMP, the SMA, or combinations thereof into a compressed form as previously described.

In one or more embodiments, the method may further including roughening the inner layer of the fluid loss control additive, roughening the outer layer of the fluid loss control additive, or both. Roughening the surfaces of the layers may result in an interlocking effect between the inner and outer layer, such that the roughened inner layer, roughened outer layer, or both more securely attach together upon contacting than the inner layer and outer layer would were they not roughened. In embodiments, the roughening may include chemical or physical roughening at the microscale.

The term "rough" refers to a surface having at least one deviation from the normalized plane of the surface, such as a depression or protrusion. The surface may be uneven and irregular and may have one or more imperfections, such as dimples, stipples, bumps, projections or other surface defects. The rough surface may have an arithmetic average roughness ($R_a$) of greater than or equal to 1 micron (µm). $R_a$ is defined as the arithmetic average of the differences between the local surface heights and the average surface height and can be described by Equation 1, contemplating n measurements:

$$R_a = \frac{1}{n}\sum_{i=1}^{n} |y_i| \quad \text{EQUATION 1}$$

In Equation 1, each $y_i$ is the amount of deviation from the normalized plane of the surface (meaning the depth or height of a depression or protrusion, respectively) of the absolute value of the ith of n measurements. Thus, $R_a$ is the arithmetic average of the absolute values of n measurements of deviation y from the normalized plane of the surface. In some embodiments, the surface of the proppant particle 110 may have an $R_a$ of greater than or equal to 1 μm, or greater than or equal to 10 μm, or greater than or equal to 50 μm, or greater than or equal to 75 μm, or greater than or equal to 100 μm.

This disclosure also recites a drilling fluid including the fluid loss control additive and a liquid carrier. The liquid carrier may comprise an aqueous phase, or, alternatively, an oleaginous phase. The aqueous phase may include fresh water, salt water, brine, municipal water, formation water, produced water, well water, filtered water, distilled water, sea water, or combinations thereof. The aqueous phase in some embodiments may use water containing organic compounds or salt. Without being bound by any particular theory, salt or organic compounds may be incorporated into the aqueous phase to control the density of the emulsified drilling fluid. Increasing the saturation of the aqueous phase by increasing the salt concentration or the level of organic compounds in the aqueous phase may increase the density of the drilling fluid. Suitable salts include but are not limited to alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides or combinations of these. In some particular embodiments, brine may be used in the aqueous phase. Without being bound by any particular theory, brine may be used to create osmotic balance between the drilling fluid and the subterranean formation.

In some embodiments, the drilling fluid may contain from 10 weight percent (wt. %) to 70 wt. % of the aqueous phase based on the total weight of the drilling fluid. In some embodiments, the drilling fluid may contain from 28 pounds per barrel (lb/bbl) to 630 lbs/bbl, from 30 to 600 lb/bbl, from 50 to 500 lb/bbl, from 100 to 500 lb/bbl, 200 to 500 lb/bbl, or 300 to 600 lb/bbl of the aqueous phase.

The aqueous phase may include a clay-based component. The clay-based component may include lime (CaO), $CaCO_3$, bentonite, montmorillonite clay, barium sulfate (barite), hematite ($Fe_2O_3$), mullite ($3Al_2O_3 \cdot 2SiO_2$ or $2Al_2O_3 \cdot SiO_2$), kaolin ($Al_2Si_2O_5(OH)_4$ or kaolinite), alumina ($Al_2O_3$, or aluminum oxide), silicon carbide, tungsten carbide, or combinations thereof. In some embodiments, the clay-based component may be bentonite. Without being bound by any particular theory, use of a clay-based component may increase the viscosity and rheology of the drilling fluid as compared to a drilling fluid without a clay-based component to allow for better drill lubrication, shear strength, and transportation of cuttings.

The drilling fluid may contain from 0.01 wt. % to 80 wt. % of the clay-based component based on the total weight of the drilling fluid. The drilling fluid may contain from 28 to 720 lb/bbl of the clay-based component based on the total weight of the drilling fluid. In some embodiments, the drilling fluid may contain from 28 to 700 lb/bbl, or 50 to 700 lb/bbl, or 100 to 700 lb/bbl, or 200 to 500 lb/bbl of the clay-based component.

The drilling fluid of the present embodiments may include an oleaginous phase. As stated, the oleaginous phase refers to a fluid containing, producing, resembling, or having the properties of oil. The oleaginous phase may be oil, such as natural or synthetic liquid oil. The oleaginous phase may be or may contain diesel oil, mineral oil, hydrogenated or unhydrogenated olefins such as poly-alpha olefins, linear and branched olefins, poly-diorganosiloxanes, silxoanes, organosiloxanes, esters of fatty acids, straight chain, branched or cyclical alkyl ethers of fatty acids, or combinations of any of these. The oleaginous phase may contain esters, ethers, acetals, dialkylcarbonates, hydrocarbons or combinations of any of these. In some embodiments, the oleaginous phase may contain or may be oils derived from petroleum, such as mineral oils, diesel oils, linear olefins, paraffin, or combinations of these oils or oils derived from plants, such as safra oil.

The drilling fluid may contain from 1 to 20 wt. % of the oleaginous phase based on the total weight of the drilling fluid. The drilling fluid may contain from 1 to 15 wt. %, from 1 to 10 wt. %, from 1 to 8 wt. %, from 1 to 5 wt. %, from 1 to 3 wt. %, from 3 to 20 wt. %, from 3 to 10 wt. %, from 3 to 8 wt. %, from 3 to 5 wt. %, from 5 to 20 wt. %, from 5 to 10 wt. %, from 5 to 8 wt. %, from 8 to 20 wt. %, from 8 to 10 wt. %, from 10 to 20 wt. %, from 10 to 15 wt. %, or from 15 to 20 wt. % of the oleaginous phase based on the total weight of the drilling fluid.

In some embodiments, the drilling fluid may contain at least one additive other than the fluid loss control additive. The one or more additives may be any additives known to be suitable for drilling fluids. As non-limiting examples, suitable additives may include weighting agents, fluid loss control agents, lost circulation control agents, viscosifiers, dispersants, pH buffers, electrolytes, glycols, glycerols, dispersion aids, corrosion inhibitors, defoamers, deformers, starches, xanthan gum polymers, surfactants, or combinations thereof. In particular some embodiments, the one or more additives may include organoclay, such as VG 69 organoclay, which is an amine-treated bentonite used as a viscosifier and gelling agent that is commercially available from Schlumberger (Houston, Tex.). The one or more additives may also include a filtration control agent, such as ADAPTA® brand filtration control agent, which is a methylstyrene acrylate copolymer used to provide filtration control in non-aqueous systems, that is commercially available from Halliburton (Houston, Tex.).

In some embodiments, the one or more additives may include a viscosifier, also referred to as a rheology modifier, which may be added to the drilling fluid to impart non-Newtonian fluid rheology to the drilling fluid to facilitate lifting and conveying rock cuttings to the surface of the wellbore. Examples of viscosifiers may include, but are not limited to, bentonite, polyacrylamide, polyanionic cellulose, or combinations of these viscosifiers. In some embodiments, the drilling fluid may include xanthan gum, a polysaccharide commonly referred to xanthan gum. The xanthan gum may be added to the water-based drilling fluid to produce a flat velocity profile of the water-based drilling fluid in annular flow, that may help to improve the efficiency of the drilling fluid in lifting and conveying rock cuttings to the surface.

The drilling fluid may include at least one surfactant. The surfactant may be anionic, cationic, or neutral. Nonlimiting examples of anionic surfactants include sulfonated polymers, sulfonated alkanes, polycarboxylated ethers, or combinations thereof. Nonlimiting examples of cationic surfactants include trimethylalkylammonium salts, alkylbenxylammonium salts, or combinations thereof. Nonlimiting examples of neutral surfactants include proteins, polyethylene glycol derivatives, oligosaccharides, cholesterol derivatives, or combinations thereof. The surfactant may include at least one of sulfonated polymers, sulfonated alkanes, polycarboxylated ethers, trimethylalkylammonium salts, alkylbenzylammonium salts, proteins, polyethylene glycol derivatives, oligosaccharides, or cholesterol derivatives. The drilling fluid may contain from 0.01 wt. % to 20 wt. % of the surfactant based on the total weight of the hydraulic fracturing fluid. The drilling fluid may contain from 0.02 lb/bbl to 180 lb/bbl of the surfactant based on the total weight of the drilling fluid, such as from 0.02 to 150 lb/bbl, or from 0.05 to 150 lb/bbl. In some embodiments, the drilling fluid may contain from 0.1 to 150 lb/bbl, or from 0.1 to 100 lb/bbl, or from 1 to 100 lb/bbl of the surfactant.

In some embodiments, the drilling fluid may contain from 0.01 wt. % to 20 wt. % of the one or more additives based on the total weight of the drilling fluid. The drilling fluid may contain from 0.02 lb/bbl to 180 lb/bbl of the one or more additives based on the total weight of the drilling fluid, such as from 0.02 to 150 lb/bbl, or from 0.05 to 150 lb/bbl. In some embodiments, the drilling fluid may contain from 0.1 to 150 lb/bbl, or from 0.1 to 100 lb/bbl, or from 1 to 100 lb/bbl of the one or more additives.

In some embodiments, the one or more additives may include solids, sometimes referred to as weighting material, which may be dispersed in the drilling fluid. The solids may be finely divided solids having a specific gravity (SG) of greater than 1 that may be added to the drilling fluid to increase the density of the drilling fluid. Examples of weighting materials suitable for use as the solid include, but are not limited to, barite (minimum SG of 4.20), hematite (minimum SG of 5.05), calcium carbonate (minimum SG of 2.7-2.8), siderite (minimum SG of 3.8), ilmenite (minimum SG of 4.6), or any combination of these weighting materials. In some embodiments, the drilling fluid may include barite as the solid.

In embodiments, the drilling fluid may have a solids content of from 1 wt. % to 80 wt. % based on the weight of the solid weighing material based on the total weight of the drilling fluid. The drilling fluid may have a solids content of from 2.5 lb/bbl to 720 lb/bbl, such as from 2.5 to 720 lb/bbl, or 2.5 to 700 lb/bbl. In some embodiments, the drilling fluid may have a solids content of from 5 to 700 lb/bbl, from 50 to 500 lb/bbl, or from 100 to 600 lb/bbl.

Alternatively, in some embodiments, solids may not be needed to stabilize the drilling fluid. Thus, in some embodiments, the drilling fluid may not contain solids, or may not contain more than 2 lbs/bbl, such as less than 1 lb/bbl of solids.

As stated, the addition of solids may be used to control the density of the drilling fluid. In some embodiments, the drilling fluid may have a density of from 50 pounds of mass per cubic foot (pcf) to 160 pcf, as measured using a mud balance in accordance with the American Petroleum Institute (API) recommended practice 13B-2. For instance, the drilling fluid may have a density of from 50 pcf to 150 pcf, from 50 pcf to 140 pcf, from 75 pcf to 160 pcf, from 75 pcf to 150 pcf, from 75 pcf to 140 pcf, from 100 pcf to 160 pcf, from 100 pcf to 150 pcf, or from 100 pcf to 140 pcf. In some embodiments, the drilling fluid may have a density of from 50 pcf to 75 pcf, or from 75 pcf to 100 pcf, or from 120 pcf to 160 pcf.

Embodiments of the disclosure further relate to methods of producing a drilling fluid including the fluid loss control additive as previously described. The produced drilling fluids may be in accordance with any of the embodiments previously described. The method may include producing the fluid loss control additive using the steps described previously and adding the fluid loss control additive to the drilling fluid. The method may further include mixing an aqueous phase, an oleaginous phase, and the fluid loss control additive to produce the drilling fluid. The aqueous phase, oleaginous phase, and fluid loss control additive may be in accordance with any of the embodiments previously described.

In some embodiments, mixing the aqueous phase, clay-based component, and fluid loss control additive may include shearing. The drilling fluid may be mixed at a shear speed of from 4000 rotations per minute (RPM) to 16000 RPM. The mixture may be mixed at a shear speed of from 4000 RPM to 15000 RPM, or from 5000 RPM to 15000 RPM, or from 5000 RPM to 1000 RPM, or from 8000 RPM to 16000 RPM, or from 10000 RPM to 16000 RPM, or from 12000 RPM to 16000 RPM.

The method may further include mixing at least one or more additives selected from the group consisting of weighting agents, fluid loss control agents, lost circulation control agents, viscosifiers, dispersants, pH buffers, electrolytes, glycols, glycerols, dispersion aids, corrosion inhibitors, defoamers, deformers, starches, xanthan gum polymers, surfactants, or combinations thereof with the aqueous phase, the clay-based component, and the fluid loss control additive to form the drilling fluid. The additives may be in accordance with any of the embodiments previously described.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modifications and variations come within the scope of the appended claims and their equivalents. Unless otherwise stated within the application, all tests, properties, and experiments are conducted at room temperature and atmospheric pressure.

The presently described subject matter may include one or more aspects, which should not be regarded as limiting on the teachings of the present disclosure. A first aspect may include a method for reducing lost circulation in a wellbore comprising: introducing a fluid comprising a fluid loss control additive comprising shape memory polymer, shape memory alloy, or both into the wellbore; allowing the fluid loss control additive to lodge within fractures within a subsurface formation in the wellbore; and allowing the fluid loss control additive to expand within the fractures, thereby forming a barrier between the wellbore and the subsurface formation to reduce lost circulation in the wellbore.

A second aspect includes a method for producing a fluid comprising: forming a fluid loss control additive via 3D printing, in which the fluid loss control additive comprises shape memory polymer, shape memory alloy, or both; printing the fluid loss control additive in an expanded form at a printing temperature $T_p$, where $T_p=T_e$; cooling the fluid loss control additive to a temperature less than $T_p$; closing the fluid loss control additive into a compressed form; and adding the fluid loss control additive comprising the compressed shape memory polymer into the fluid.

A third aspect includes a fluid comprising a fluid loss control additive comprising shape memory polymer, shape memory alloy, or both; and a liquid carrier.

Another aspect includes any of the previous aspects, in which the fluid loss control additive comprises an inner layer comprising a first shape memory polymer and an outer layer.

Another aspect includes any of the previous aspects, in which the first shape memory polymer comprises a composite having fibers infused with shape memory polymer resin.

Another aspect includes any of the previous aspects, in which the outer layer comprises shape memory alloy.

Another aspect includes any of the previous aspects, in which the shape memory alloy comprises a metal alloy including one or more of nickel, titanium, copper, gold, iron, zinc, aluminum, or combinations thereof.

Another aspect includes any of the previous aspects, in which: the shape memory alloy has an expansion temperature $T_e$; the fluid loss control additive expands from a compressed form to an expanded form at a temperature equal to or greater than $T_e$; the subsurface formation has a formation temperature $T_f$ greater than or equal to $T_e$; and allowing the fluid loss control additive to expand within the fractures comprises allowing the fluid loss control additive to expand from the compressed form to the expanded form once a temperature of the shape memory alloy is greater than or equal to $T_e$.

Another aspect includes any of the previous aspects, further comprising: forming the fluid loss control additive via 3D printing; printing the fluid loss control additive in an expanded form at a printing temperature $T_p$, where $T_p=T_e$; cooling the fluid loss control additive to a temperature less than $T_p$; closing the fluid loss control additive into a compressed form; and adding the fluid loss control additive into the fluid.

Another aspect includes any of the previous aspects, in which the first shape memory polymer comprises polyether ether ketone, sulfonated polyether ether ketone, polystyrene, poly(lauryl acrylate), polyurethane, polydimethylsiloxane, or combinations thereof.

Another aspect includes any of the previous aspects, in which the shape memory alloy comprises a nickel-titanium alloy.

Another aspect includes any of the previous aspects, in which: the first shape memory polymer comprises polyether ether ketone, sulfonated polyether ether ketone, polystyrene, poly(lauryl acrylate), or combinations thereof; and the outer layer comprises a second shape memory polymer comprising polyurethane, polydimethylsiloxane, or combinations thereof.

Another aspect includes any of the previous aspects, in which: the first shape memory polymer has a glass transition temperature $T_{g1}$ and a melting temperature $T_{m1}$; the outer layer comprises a second shape memory polymer having a glass transition temperature $T_{g2}$ and a melting temperature $T_{m2}$; and $T_{g1}>T_{g2}$, $T_{m1}>T_{m2}$, or both.

Another aspect includes any of the previous aspects, in which: $T_{g2}$, $T_{m2}$, or both range from 50° C. to 250° C.; and allowing the fluid loss control additive to expand within the fractures comprises allowing the shape memory polymer to expand from compressed form to the expanded form once a temperature of the outer layer is greater than or equal to $T_{g2}$, $T_{m2}$, or both.

Another aspect includes any of the previous aspects, in which: the subsurface formation has a formation temperature $T_f$ of greater than or equal to $T_{g2}$, $T_{m2}$, or both; and allowing the fluid loss control additive to expand within the fractures comprises allowing the shape memory polymer to expand from compressed form to the expanded form once a temperature of the outer layer is greater than or equal to $T_{g2}$, $T_{m2}$, or both.

Another aspect includes any of the previous aspects, further comprising: roughening the inner layer and the outer layer at a microscale; contacting the roughened inner layer and the roughened outer layer, thereby interlocking the roughened inner layer and the roughened outer layer.

Another aspect includes any of the previous aspects, in which the inner layer has a thickness ranging from 0.5 to 5 mm and the outer layer has a thickness ranging from 0.5 to 5 mm.

Another aspect includes any of the previous aspects, in which: the fluid loss control additive has a diameter of from greater than or equal to 0.5 mm to less than or equal to 8 mm before expansion; and the expanded fluid loss control additive has a diameter of from greater than or equal to 5 mm to less than or equal to 20 mm.

Another aspect includes any of the previous aspects, in which the fluid loss control additive comprises shape memory alloy comprising a metal alloy including one or more of nickel, titanium, copper, gold, iron, zinc, aluminum, or combinations thereof.

Another aspect includes any of the previous aspects, in which: the shape memory alloy has an expansion temperature $T_e$; the shape memory alloy expands from a compressed form to an expanded form at a temperature equal to or greater than $T_e$; the subsurface formation has a formation temperature $T_f$ greater than or equal to $T_e$; and allowing the fluid loss control additive to expand within the fractures comprises allowing the shape memory alloy to expand from the compressed form to the expanded form once a temperature of the shape memory alloy is greater than or equal to $T_e$.

Another aspect includes any of the previous aspects, in which the shape memory polymer further comprises nano-silica, nano-alumina, nano-zinc oxide, carbon nanotubes, nano-calcium carbonate, mica, vanadium pentoxide, boron nitride nanotubes, nano-zirconium oxide, graphene, carbon black, or combinations of these.

Another aspect includes any of the previous aspects, in which allowing the fluid loss control additive to expand within the fractures comprises allowing the fluid loss control additive to blossom such that side portions of the fluid loss control additive separate and extend outwards from a center of the fluid loss control additive.

Another aspect includes any of the previous aspects, in which the fluid comprises an aqueous solution comprising deionized water, tap water, fresh water, salt water, natural or synthetic brine, municipal water, formation water, produced water, well water, filtered water, distilled water, sea water, or combinations of these.

Another aspect includes any of the previous aspects, in which the fluid comprises an oleaginous phase comprising natural oil, synthetic oil, diesel oil, mineral oil, hydrogenated olefins, unhydrogenated olefins, poly-alpha olefins, linear olefins, branched olefins, poly-diorganosiloxanes, siloxanes, organosiloxanes, esters of fatty acids, straight chain, branched alkyl ethers of fatty acids, cyclical alkyl ethers of fatty acids, esters, ethers, acetals, dialkylcarbonates, hydrocarbons, parrafins, safra oil, or combinations thereof.

Another aspect includes any of the previous aspects, in which the fluid comprises a clay-based component comprising one or more components selected from the group consisting of lime (CaO), $CaCO_3$, bentonite, montmorillonite clay, barium sulfate (barite), hematite ($Fe_2O_3$), mullite ($3Al_2O_3 \cdot 2SiO_2$ or $2Al_2O_3 \cdot SiO_2$), kaolin ($Al_2Si_2O_5(OH)_4$ or kaolinite), alumina ($Al_2O_3$, or aluminum oxide), silicon carbide, tungsten carbide, or combinations thereof.

Another aspect includes any of the previous aspects, further comprising mixing at least one or more additives selected from the group consisting of weighting agents, fluid loss control agents, lost circulation control agents, viscosifiers, dispersants, pH buffers, electrolytes, glycols, glycerols, dispersion aids, corrosion inhibitors, defoamers, deformers, starches, xanthan gum polymers, surfactants, or combinations thereof.

Having described the subject matter of the present disclosure in detail and by reference to specific embodiments of these, it is noted that the various details disclosed in this disclosure should not be taken to imply that these details relate to elements that are essential components of the various embodiments described in this disclosure, even in cases where a particular element is illustrated in each of the drawings that accompany the present description. Further, it will be apparent that modifications and variations are possible without departing from the scope of the present disclosure, including, but not limited to, embodiments defined in the appended claims.

What is claimed is:

1. A method of reducing lost circulation in a wellbore comprising:
   introducing a fluid comprising a fluid loss control additive comprising an inner layer comprising a first shape memory polymer and an outer layer comprising shape memory alloy into the wellbore;
   allowing the fluid loss control additive to lodge within fractures within a subsurface formation in the wellbore; and
   allowing the fluid loss control additive to expand within the fractures, thereby forming a barrier between the wellbore and the subsurface formation to reduce lost circulation in the wellbore.

2. The method of claim 1, in which the first shape memory polymer comprises a composite having fibers infused with shape memory polymer resin.

3. The method of claim 1, in which the shape memory alloy comprises a metal alloy including one or more of nickel, titanium, copper, gold, iron, zinc, aluminum, or combinations thereof.

4. The method of claim 3, in which:
   the shape memory alloy has an expansion temperature $T_e$;
   the fluid loss control additive expands from a compressed form to an expanded form at a temperature equal to or greater than $T_e$;
   the subsurface formation has a formation temperature $T_f$ greater than or equal to $T_e$; and
   allowing the fluid loss control additive to expand within the fractures comprises allowing the fluid loss control additive to expand from the compressed form to the expanded form once a temperature of the shape memory alloy is greater than or equal to $T_e$.

5. The method of claim 4, further comprising:
   forming the fluid loss control additive via 3D printing;
   printing the fluid loss control additive in an expanded form at a printing temperature $T_p$, where $T_p=T_e$;
   cooling the fluid loss control additive to a temperature less than $T_p$;
   closing the fluid loss control additive into a compressed form; and
   adding the fluid loss control additive into the fluid.

6. The method of claim 1, in which the first shape memory polymer comprises polyether ether ketone, sulfonated polyether ether ketone, polystyrene, poly(lauryl acrylate), polyurethane, polydimethylsiloxane, or combinations thereof.

7. The method of claim 6, in which the shape memory alloy comprises a nickel-titanium alloy.

8. The method of claim 1:
   further comprising roughening the inner layer and the outer layer at a microscale;
   further comprising contacting the roughened inner layer and the roughened outer layer, thereby interlocking the roughened inner layer and the roughened outer layer;
   in which the inner layer has a thickness ranging from 0.5 to 5 mm and the outer layer has a thickness ranging from 0.5 to 5 mm;
   in which the fluid loss control additive has a diameter of from greater than or equal to 0.5 mm to less than or equal to 8 mm before expansion; and
   in which the expanded fluid loss control additive has a diameter of from greater than or equal to 5 mm to less than or equal to 20 mm.

9. The method of claim 1, in which the fluid loss control additive comprises shape memory alloy comprising a metal alloy including one or more of nickel, titanium, copper, gold, iron, zinc, aluminum, or combinations thereof.

10. The method of claim 9, in which:
the shape memory alloy has an expansion temperature $T_e$;
the shape memory alloy expands from a compressed form to an expanded form at a temperature equal to or greater than $T_e$;
the subsurface formation has a formation temperature Tf greater than or equal to $T_e$; and
allowing the fluid loss control additive to expand within the fractures comprises allowing the shape memory alloy to expand from the compressed form to the expanded form once a temperature of the shape memory alloy is greater than or equal to $T_e$.

11. The method of claim 10, further comprising:
forming the fluid loss control additive via 3D printing;
printing the fluid loss control additive in an expanded form at a printing temperature $T_p$, where $T_p=T_e$;
cooling the fluid loss control additive to a temperature less than $T_p$;
closing the fluid loss control additive into a compressed form; and
adding the fluid loss control additive into the fluid.

12. The method of claim 9, in which the shape memory alloy comprises a nickel- titanium alloy.

13. The method of claim 1, in which the shape memory polymer further comprises nano-silica, nano-alumina, nano-zinc oxide, carbon nanotubes, nano-calcium carbonate, mica, vanadium pentoxide, boron nitride nanotubes, nano-zirconium oxide, graphene, carbon black, or combinations of these.

14. The method of claim 1, in which allowing the fluid loss control additive to expand within the fractures comprises allowing the fluid loss control additive to blossom such that side portions of the fluid loss control additive separate and extend outwards from a center of the fluid loss control additive.

15. The method of claim 1:
in which the fluid comprises an aqueous solution comprising deionized water, tap water, fresh water, salt water, natural or synthetic brine, municipal water, formation water, produced water, well water, filtered water, distilled water, sea water, or combinations of these;
in which the fluid comprises an oleaginous phase comprising natural oil, synthetic oil, diesel oil, mineral oil, hydrogenated olefins, unhydrogenated olefins, poly-alpha olefins, linear olefins, branched olefins, polydiorganosiloxanes, siloxanes, organosiloxanes, esters of fatty acids, straight chain alkyl ethers of fatty acids, branched alkyl ethers of fatty acids, cyclical alkyl ethers of fatty acids, esters, ethers, acetals, dialkylcarbonates, hydrocarbons, paraffins, safra oil, or combinations thereof;
in which the fluid comprises a clay-based component comprising one or more components selected from the group consisting of lime (CaO), $CaCO_3$, bentonite, montmorillonite clay, barium sulfate (barite), hematite ($Fe_2O_3$), mullite ($3Al_2O_3.2SiO_2$ or $2Al_2O_3.SiO_2$), kaolin ($Al_2Si_2O_5(OH)_4$ or kaolinite), alumina ($Al_2O_3$, or aluminum oxide), silicon carbide, tungsten carbide, or combinations thereof; and
further comprising mixing at least one or more additives selected from the group consisting of weighting agents, fluid loss control agents, lost circulation control agents, viscosifiers, dispersants, pH buffers, electrolytes, glycols, glycerols, dispersion aids, corrosion inhibitors, defoamers, deformers, starches, xanthan gum polymers, surfactants, or combinations thereof.

16. A method of reducing lost circulation in a wellbore comprising:
introducing a fluid comprising a fluid loss control additive comprising an inner layer comprising a first shape memory polymer and an outer layer into the wellbore, wherein the first shape memory polymer comprises polyether ether ketone, sulfonated polyether ether ketone, polystyrene, poly(lauryl acrylate), or combinations thereof; and
the outer layer comprises a second shape memory polymer comprising polyurethane, polydimethylsiloxane, or combinations thereof;
allowing the fluid loss control additive to lodge within fractureswithin a subsurface formation in the wellbore; and
allowing the fluid loss control additive to expand within the fractures, thereby forming a barrier between the wellbore and the subsurface formation to reduce lost circulation in the well bore.

17. The method of claim 16, in which:
the first shape memory polymer has a glass transition temperature $T_{g1}$ and a melting temperature $T_{m1}$;
the outer layer comprises a second shape memory polymer having a glass transition temperature $T_{g2}$ and a melting temperature $T_{m2}$; and
$T_{g1}>T_{g2}>T_{m1}>T_{m2}$, or both.

18. The method of claim 17, in which:
$T_{g2}$, $T_{m2}$, or both range from 50° C. to 250° C.; and
allowing the fluid loss control additive to expand within the fractures comprises allowing the shape memory polymer to expand from compressed form to the expanded form once a temperature of the outer layer is greater than or equal to $T_{g2}$, $T_{m2}$, or both.

19. The method of claim 17, in which:
the subsurface formation has a formation temperature $T_f$ of greater than or equal to $T_{g2}$, $T_{m2}$, or both; and
allowing the fluid loss control additive to expand within the fractures comprises allowing the shape memory polymer to expand from compressed form to the expanded form once a temperature of the outer layer is greater than or equal to $T_{g2}$, $T_{m2}$, or both.

* * * * *